(12) United States Patent
Murofushi et al.

(10) Patent No.: US 8,688,884 B2
(45) Date of Patent: Apr. 1, 2014

(54) INFORMATION PROCESSING SYSTEM AND FUNCTIONALITY EXPANSION APPARATUS

(75) Inventors: Ippei Murofushi, Nagono (JP); Takamitsu Kasai, Nagano (JP)

(73) Assignee: Sony Corporation, Tokyo (JP)

( * ) Notice: Subject to any disclaimer, the term of this patent is extended or adjusted under 35 U.S.C. 154(b) by 201 days.

(21) Appl. No.: 13/336,542

(22) Filed: Dec. 23, 2011

(65) Prior Publication Data

US 2012/0173784 A1 Jul. 5, 2012

(30) Foreign Application Priority Data

Jan. 5, 2011 (JP) ................................ P2011-000807

(51) Int. Cl.
*G06F 13/00* (2006.01)

(52) U.S. Cl.
USPC .......................................................... 710/300

(58) Field of Classification Search
USPC .................................. 709/209; 710/300–304
See application file for complete search history.

(56) References Cited

U.S. PATENT DOCUMENTS

| | | | | |
|---|---|---|---|---|
| 4,460,994 A * | 7/1984 | Scanlon et al. | ............... | 370/452 |
| 5,564,024 A * | 10/1996 | Pemberton | .................... | 710/302 |
| 5,600,800 A * | 2/1997 | Kikinis et al. | ................ | 710/303 |
| 5,694,615 A * | 12/1997 | Thapar et al. | ..................... | 710/2 |
| 5,826,042 A * | 10/1998 | Kirkendoll | .................... | 710/303 |
| 5,864,708 A * | 1/1999 | Croft et al. | ........................ | 710/1 |
| 5,881,249 A * | 3/1999 | Reasoner | ...................... | 710/300 |
| 6,115,773 A * | 9/2000 | Capps et al. | .................. | 710/300 |
| 6,353,865 B1 * | 3/2002 | Kiryu et al. | .................... | 710/305 |
| 6,430,632 B1 * | 8/2002 | Ain et al. | ......................... | 710/61 |
| 6,496,583 B1 * | 12/2002 | Nakamura et al. | ............. | 380/268 |
| 6,665,763 B1 * | 12/2003 | Burns et al. | .................... | 710/301 |
| 6,725,282 B1 * | 4/2004 | Grzybowski et al. | ............. | 710/2 |
| 6,751,699 B1 * | 6/2004 | Langley et al. | ............... | 710/317 |
| 6,754,720 B1 * | 6/2004 | Packer | .............. | 710/3 |
| 6,816,915 B1 * | 11/2004 | Packer | ............................. | 710/2 |
| 6,820,139 B1 * | 11/2004 | Binford et al. | ..................... | 710/3 |
| 6,957,291 B2 * | 10/2005 | Moon et al. | .................... | 710/302 |
| 7,024,257 B2 * | 4/2006 | Pearce et al. | ..................... | 700/72 |
| 7,167,441 B2 * | 1/2007 | Donoghue et al. | ............ | 370/216 |
| 7,565,467 B2 * | 7/2009 | Nagase | ........................... | 710/62 |
| 7,673,089 B2 * | 3/2010 | Hinchey | ......................... | 710/300 |
| 8,521,916 B2 * | 8/2013 | Munetoh | ......................... | 710/14 |
| 2005/0050191 A1 * | 3/2005 | Hubis | ........................... | 709/223 |
| 2010/0138582 A1 * | 6/2010 | Bird et al. | ...................... | 710/303 |
| 2011/0004597 A1 * | 1/2011 | Engel et al. | .................... | 707/741 |

FOREIGN PATENT DOCUMENTS

JP 2010-20506 1/2010

* cited by examiner

*Primary Examiner* — Paul R Myers
(74) *Attorney, Agent, or Firm* — Frommer Lawrence & Haug LLP; William S. Frommer

(57) ABSTRACT

An information processing system is disclosed which includes: an information processing apparatus proper configured to include an optical communication connection portion establishing optical communication connection; a first functionality expansion apparatus configured to have an optical communication connection portion optically communicating with the information processing apparatus proper, and a first processing function portion processing or storing data for use by the information processing apparatus; and a second functionality expansion apparatus configured to have an optical communication connection portion optically communicating with the first functionality expansion apparatus, and a second processing function portion.

5 Claims, 12 Drawing Sheets

INFORMATION PROCESSING SYSTEM AND FUNCTIONALITY EXPANSION APPARATUS

BACKGROUND

The present disclosure relates to an information processing system and a functionality expansion apparatus. More particularly, the disclosure relates to an information processing system configured with a portable information processing apparatus such as a laptop computer and with component apparatuses connectable to the processing apparatus proper, as well as to a functionality expansion apparatus for use with the information processing system.

In recent years, portable computer apparatuses such as laptop computers have progressed in performance and multiplied in function. Some computer apparatuses have each been developed with diverse processing portions incorporated in one enclosure. For example, a single computer apparatus may incorporate a mass-storage hard disk drive, a high-performing optical disk drive, and a high-powered graphic processor to attain a level of performance comparable with that of a high-end desktop computer apparatus.

Meanwhile, some other computer apparatuses are each designed not as an apparatus proper incorporating every feasible function but as a laptop computer connectable to peripheral devices dedicated thereto, the peripherals including such devices as the above-mentioned mass-storage hard disk drive. These peripheral devices may be turned into what may be called a docking station. Typically, the docking station may be set up at home, in the office or the like where the computer apparatus is used on a daily basis. When going out, the user of the computer may carry only the apparatus proper around after detaching it from the docking station. In this way, the computer apparatus may constitute a high-end computer when connected with its docking station and may be used as a portable, relatively lightweight laptop when detached therefrom.

Japanese Patent Laid-open No. 2010-205006 describes typical structures of the docking station connectable to a laptop computer apparatus.

SUMMARY

The ordinary docking station may conceivably be structured to have an extension of the bus lines from inside the computer apparatus proper. With this structure, the docking station may be treated as if it were incorporated in the computer apparatus proper.

If the bus lines inside the computer apparatus proper are extended substantially unmodified to the docking station, the docking station when connected to the computer apparatus will serve as if it were an incorporated part of the computer proper. However, this structure entails preparing complex structural arrangements to make the connection. For example, it is necessary to couple the computer apparatus proper with its docking station using a terminal portion having a very large number of terminals. The structures of the connection portions involved become complicated, and a prolonging of the connection distance is difficult to achieve.

In the examples described by the above-cited document, the docking station is shown to be installed immediately under the laptop computer. The degree of freedom in setting up the computer and its docking station is thus limited. If the mode of computer use and the space for installation are subject to constraints, the ease of operation of the computer may not be very high.

The present disclosure has been made in view of the above circumstances and provides innovative arrangements for improving the ease of operation of an apparatus connectable with an information processing apparatus, the connectable apparatus being similar to an ordinary docking station for use with computer equipment.

According to one embodiment of the present disclosure, there is provided an information processing system including: an information processing apparatus proper configured to include an optical communication connection portion establishing optical communication connection; a first functionality expansion apparatus configured to have an optical communication connection portion optically communicating with the information processing apparatus proper, and a first processing function portion processing or storing data for use by the information processing apparatus; and a second functionality expansion apparatus configured to have an optical communication connection portion optically communicating with the first functionality expansion apparatus, and a second processing function portion.

According to another embodiment of the present disclosure, there is provided a functionality expansion apparatus including: an optical communication connection portion configured to perform optical communication; a processing function portion configured to process or store data for use by an information processing apparatus; a first connection portion configured to connect with another functionality expansion apparatus having an optical communication connection portion and another processing function portion; and a second connection portion configured to connect with the information processing apparatus proper.

According to yet another embodiment of the present disclosure, there is provided a functionality expansion apparatus including: an optical communication terminal portion configured to transmit an optical signal to and from an information processing apparatus proper;

a multiplexing/demultiplexing portion configured to demultiplex signals entering the optical communication terminal portion into different signal types and to multiplex signals to be output from the optical communication terminal portion; and a plurality of processing function connection portions configured to connect with a processing function portion processing and/or storing data for use by an information processing apparatus, to supply the processing function portion with the demultiplexed signals from the multiplexing/demultiplexing portion, and to supply the multiplexing/demultiplexing portion with the data acquired by the processing function portion.

With the above structure, the first or second functionality expansion apparatus connected to the information processing apparatus proper has the processing function portion working to process or store data for a particular function desired to be expanded, whereby the functionality of the information processing apparatus is enhanced. In this case, the functionality expansion apparatus optically communicates with the information processing apparatus proper, so that large quantities of data can be communicated therebetween at high speed. The structure permits a level of data processing comparable with that achieved using a processing function portion incorporated inside the information processing apparatus proper.

According to the present disclosure, the functionality expansion apparatus may have a plurality of processing function connection portions configured to connect with various processing function portions for use with the information processing apparatus. This structure can boost the functionality of the information processing apparatus to a level comparable with that accomplished by an information processing apparatus incorporating these processing function portions. Also, the functionality expansion apparatus communicating optically with the information processing apparatus proper enhances the degree of freedom in terms of where to set up the functionality expansion apparatus relative to the information processing apparatus proper. These features provide an easy-to-use functionality expansion apparatus.

DETAILED DESCRIPTION OF THE PREFERRED EMBODIMENTS

Preferred embodiments of the present disclosure will now be described below under the following headings:
1-1. Explanation of a typical connection structure of the first embodiment (FIGS. 1 and 2);
1-2. Examples of the first embodiment in which component apparatus is detached (FIGS. 3, 4, 5A and 5B);
1-3. Connection example of the first embodiment (FIGS. 6 and 7);
1-4. Typical internal structure (first example) of the first embodiment (FIG. 8);
1-5. Another typical internal structure (second example) of the first embodiment (FIG. 9);
1-6. Another typical internal structure (third example) of the first embodiment (FIG. 10);
1-7. Another typical internal structure (fourth example) of the first embodiment (FIG. 11);
2. Typical connection structures of the second embodiment (FIGS. 12 and 13); and
3. Variations.

[1-1. Explanation of a Typical Connection Structure of the First Embodiment]

The first embodiment of the present disclosure is explained below in reference to FIGS. 1 through 11.

The first embodiment is a system structured to connect with a portable computer apparatus such as a laptop computer. With the first embodiment, its connection apparatus connectable to the computer apparatus is called a docking station.

Figure 1:
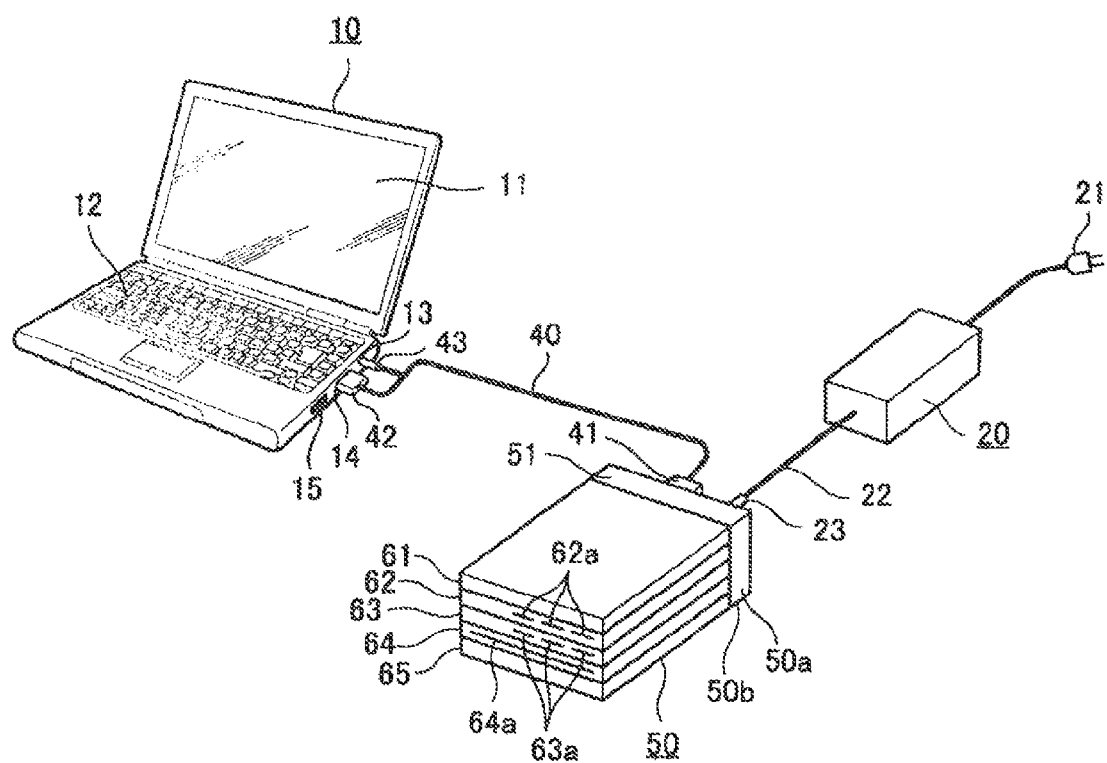
FIG. 1 is a perspective view showing a typical system configuration (a vertical layout example) as one example of a first embodiment of the present disclosure.
Figure 2:
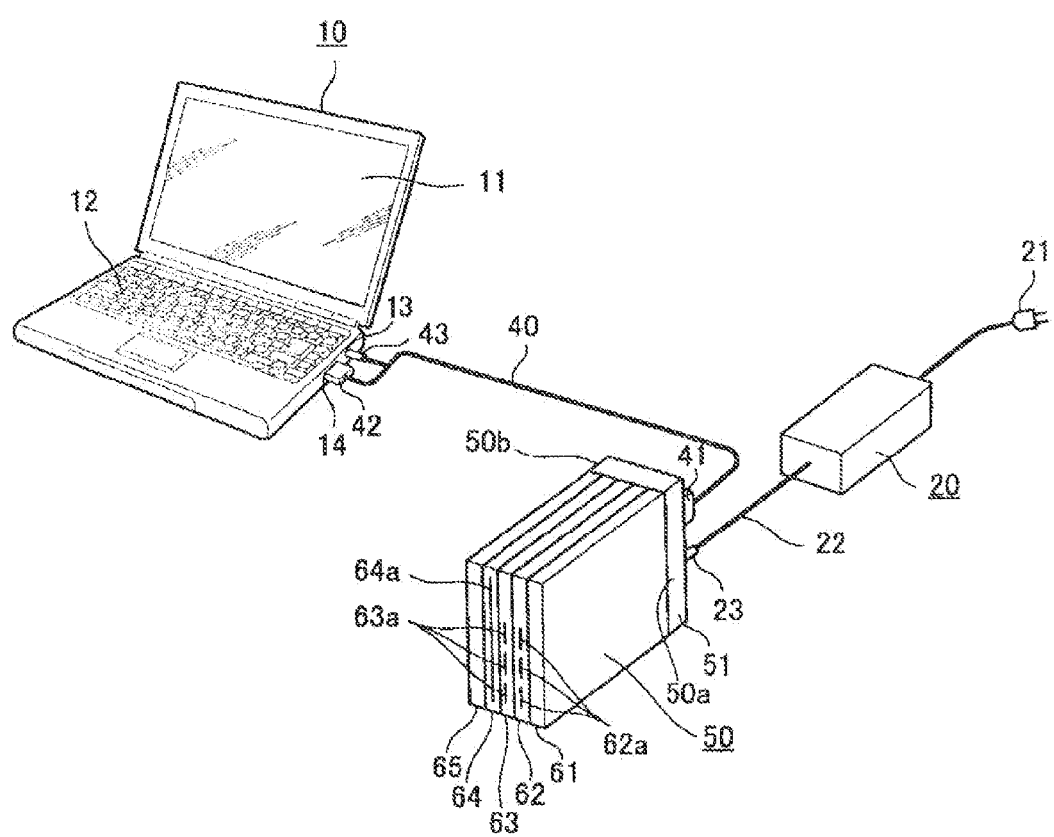
FIG. 2 is a perspective view showing another typical system configuration (a horizontal layout example) as another example of the first embodiment.

The docking station, computer apparatus, and typical connection structures composed thereof are explained first in reference to FIGS. 1 and 2.

FIGS. 1 and 2 show two different layouts of the docking station 50, one being a horizontal layout and the other being a vertical layout. The connection structure is the same for both layouts in FIGS. 1 and 2.

As shown in FIGS. 1 and 2, a laptop computer apparatus proper 10 has a display portion 11 coupled with a keyboard portion 12. A plurality of terminals are located on one edge of the keyboard portion 12 of the computer apparatus proper 10. In this example, a power input terminal 13, an optical communication terminal 14, and a USB terminal 15 are installed. An alternating current (AC) adapter or the like is connected to the power input terminal 13 to provide direct current (DC) power supply thereto. The power supply drives the computer apparatus and recharges a secondary battery located inside. An optical cable is connected to the optical communication terminal 14 for communication with peripheral devices. The USB terminal 15 permits connection with a device that conducts communications using a USB (Universal Serial Bus) standard serial bus.

The docking station 50 acting as the connection apparatus attachable to the computer apparatus proper 10 is connected with a plurality of processing apparatuses stacked for use with the computer apparatus. The processing apparatuses that may be connected are primarily made up of a processing apparatus that processes data to be handled by the computer apparatus and a storage apparatus that stores data to be used by the computer apparatus. The processing apparatuses may also include one that has data input/output ports permitting data input/output processing through the ports.

In the examples of FIGS. 1 and 2, a graphic processing apparatus 61, a LAN connection apparatus 62, a USB connection apparatus 63, an optical drive apparatus 64, and a hard disk drive apparatus 65 are connected to a connection portion 51 of the docking station 50. Each of the apparatuses 61 through 65 constitutes a functionality expansion apparatus for use with the computer apparatus.

The graphic processing apparatus 61 is a graphic processor that processes image data to be displayed by the display portion 11 on the side of the computer apparatus proper 10 (or by an external display device). This graphic processor can perform image processing in a manner more sophisticated than a built-in processor of the computer apparatus.

The LAN connection apparatus 62 is a processing apparatus equipped with a terminal 62a for connection with a LAN (Local Area Network) standard cable.

The USB connection apparatus 63 is a processing apparatus furnished with a terminal 63a for connection with a USB standard cable.

The optical drive apparatus 64 is an apparatus that writes and reads data to and from various optical disks such as DVD's. This apparatus has a disk loading portion 64a.

The hard disk drive apparatus 65 is an apparatus that stores and reads data using hard disks.

The above-mentioned apparatuses 61 through 65 are all designed to be directly connectable with the computer apparatus in compliance with common interface standards. The connection portion 51 of the docking station 50 is furnished with terminals and the like permitting connection with the apparatuses 61 through 65. Thus the apparatuses 61 through 65 are made detachable from the docking station 50. The sequences in which the apparatuses 61 through 65 are connected as shown in FIGS. 1 and 2 are only examples; the apparatuses 61 through 65 may be connected in any other sequence, as long as the terminals of their connection portions are compatible with the docking station 50.

With the first embodiment, as shown in FIGS. 1 and 2, the individual apparatuses 61, 62, 63, 64 and 65 are each housed in a flat enclosure. These apparatuses appear stacked when connected to the connection portion 51 of the docking station 50.

In the example of FIG. 1, a side 50a of the docking station 50 is positioned laterally with a bottom 50b of the docking station 50 facing downward in what may be called the horizontal layout.

In the example of FIG. 2, the side 50a of the docking station 50 is positioned upright with the bottom 50b facing upward in what may be called the vertical layout.

The side 50a and the bottom 50b are each shaped flat so that both horizontal and vertical layouts are made possible. The apparatuses may be positioned flat on a table or the like whether they are oriented horizontally or vertically.

The docking station 50 has the back of its connection portion 51 equipped with an optical communication terminal portion serving as an optical communication connection portion (hidden in FIGS. 1 and 2). The optical communication terminal portion is structured to connect with the optical communication terminal 14 on the side of the computer apparatus proper 10 by use of a connection cable 40 including an optical cable. That is, a connector 41 at one end of the optical cable included in the connection, cable 40 is connected to a terminal on the side of the connection portion 51 of the docking station 50. A connector 42 at the other end of the optical cable included in the connection cable 40 is connected to the optical communication terminal 14 on the side of the computer apparatus proper 10.

In the first embodiment, data transmission via the optical cable used for connection between the computer apparatus proper 10 and the docking station 50 complies with a so-called optical integrated interface standard that integrates numerous transmission processes. One such optical integrated interface has been proposed as the so-called Light Peak standard. According to the Light Peak standard, optical fibers are used as the transmission channel that permits full-duplex transmission of up to 10 Gbps over a maximum transmission distance of about 30 meters.

Incidentally, in the case of the first embodiment, the apparatuses 61 through 65 attached to the connection portion 51 are connected in cascade with the computer apparatus proper 10.

The connection cable 40 including the optical cable also includes a power cable integrally. One end of the power cable is connected via the connector 41 to a power output terminal (not shown) of the connection portion 51 of the docking station 50. The other end of the power cable is tipped with a power supply plug 43 connected to the power input terminal 13 of the computer apparatus 10.

In the structures of FIGS. 1 and 2, an AC adapter 20 is provided to convert commercial alternating current (AC) power obtained from a power input plug 21 into direct current (DC) low-voltage power. A power cable 22 of the AC adapter 20 is tipped with a power output plug 23 connected to a power input terminal (not shown) of the connection portion 51 of the docking station 50.

The docking station 50 has the connection portion 51 operating its internal circuits using the power thus supplied. The connection portion 51 also causes the apparatuses 61 through 65 connected therewith to operate from the power supply.

Furthermore, the computer apparatus proper 10 is powered by the AC adapter 20 via the connection cable 40 and is operated thereby. The AC adapter 20 may need to have a power capacity not only to drive the computer apparatus proper 10 but also to operate the docking station 50.

When the docking station 50 is connected to the computer apparatus proper 10 in the manner described above, the computer apparatus proper 10 stays connected with the apparatuses 61 through 65 inside the docking station 50. In this setup, the computer apparatus proper 10 can process or store data using the apparatuses 61 through 65.

[1-2. Examples of the First Embodiment in which a Component Apparatus is Detached]

Figure 3:
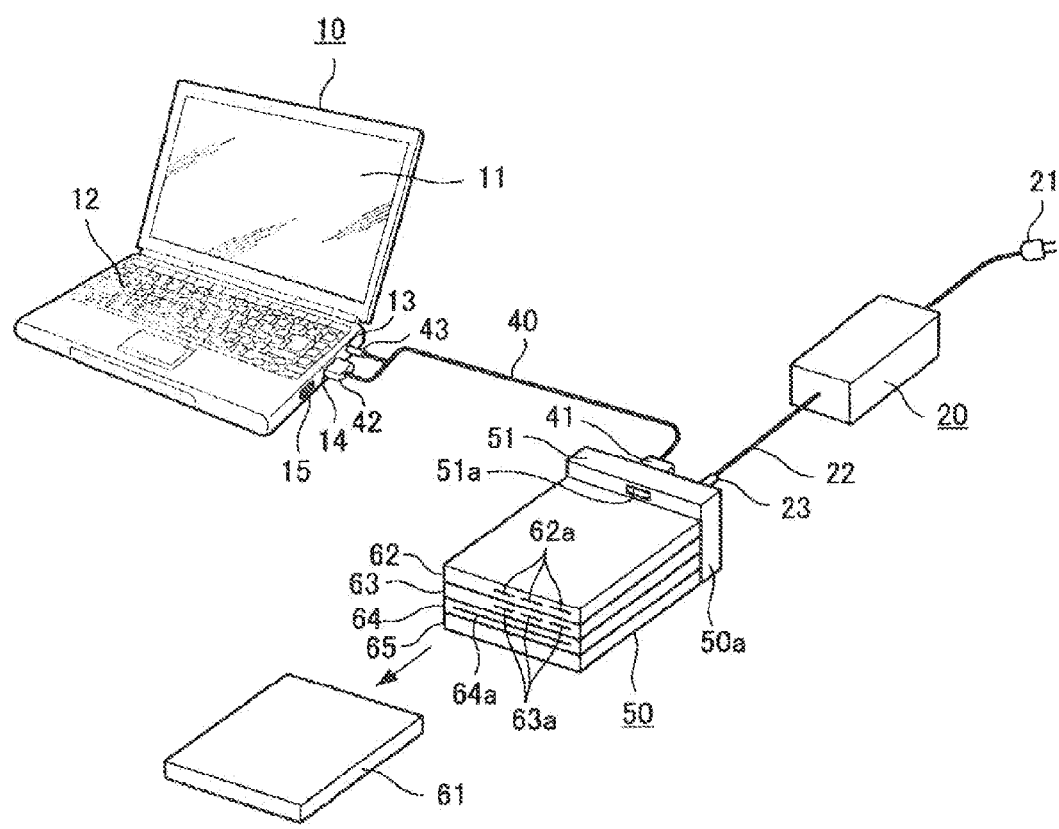
FIG. 3 is a perspective view showing another typical system configuration (a component apparatus detached) as another example of the first embodiment.

FIG. 3 shows an example in which a component apparatus is detached from the docking station 50.

Figure 4:
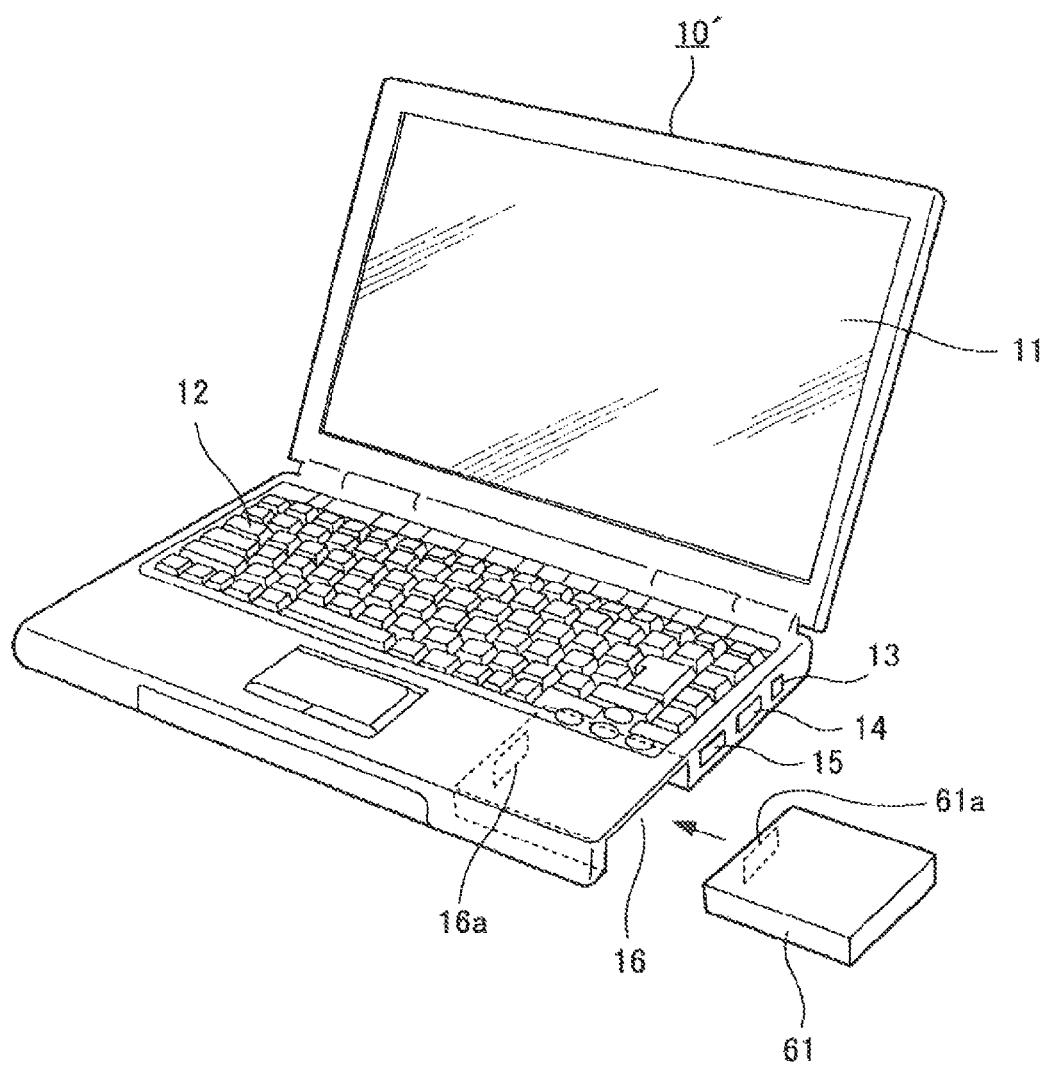
FIG. 4 is a perspective view showing another typical system configuration (a detached component apparatus again connected directly) as another example of the first embodiment.

As explained above, part or all of the apparatuses 61 through 65 connected to the connection portion 51 of the docking station 50 are detachable therefrom. FIG. 4 shows an example in which the graphic processing apparatus 61 is detached from a terminal 51a of the connection portion 51.

The graphic processing apparatus 61 thus detached may be connected directly to the optical communication terminal 14 of the computer apparatus proper 10 via an optical cable. In this manner, if the computer apparatus proper 10 is carried around after being detached from the docking station 50 located in, say, the household, the graphic function alone of the computer apparatus can be used at a high performance level.

As described above, where a component apparatus is detached from the docking station 50, the detached apparatus may be arranged to be connected directly to the PC proper.

For example, as shown in FIG. 4, a connection notch portion 16 may be provided on the bottom side of the keyboard portion 12 as part of a PC proper 10'. The connection notch portion 16 may be shaped and sized to accommodate a component apparatus detached from the docking station 50. And as indicated by broken lines in FIG. 4, a connection terminal portion 16a may be provided at the back of the connection notch portion 16. The connection terminal portion 16a is a terminal permitting optical communication in the same manner as the optical communication terminal 14.

Figure 5A:
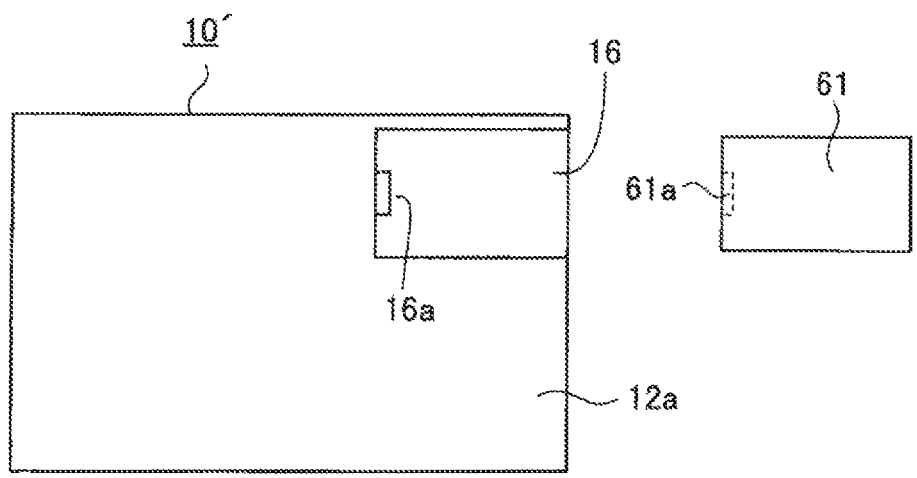
FIGS. 5A and 5B are plan views showing the bottom face of a computer apparatus proper in the connection example indicated in FIG. 4.
Figure 5B:
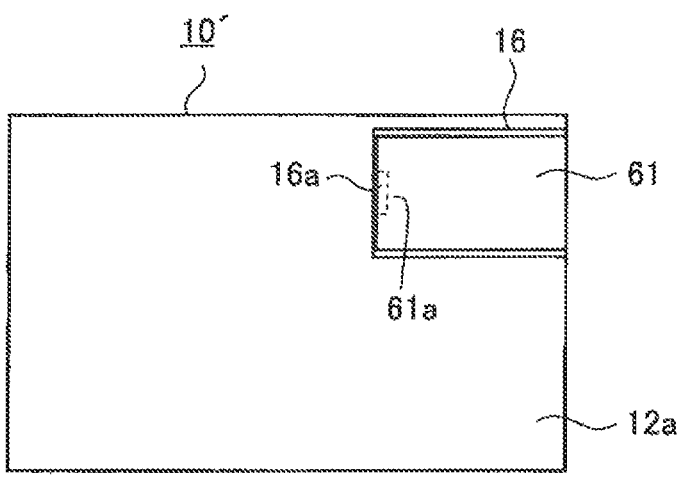

FIGS. 5A and 5B show the PC proper 10' in FIG. 4 as viewed from a bottom 12a of the keyboard portion 12. FIG. 5A indicates a state in which the graphic processing apparatus 61 remains detached, and FIG. 5B depicts a state in which the graphic processing apparatus 61 is attached.

The above structure allows a component apparatus detached from the docking station 50 as shown in FIG. 3 (graphic processing apparatus 61 in this example) to be attached to the connection notch portion 16, whereby the PC proper 10' may be integrated with the graphic processing apparatus 61.

As shown in FIGS. 4, 5A and 5B, when an optical communication terminal portion 61a of the graphic processing apparatus 61 is directly connected to the connection terminal portion 16a located inside the connection notch portion 16, the PC proper 10' is integrated with the graphic processing apparatus 61. In functional terms, the PC proper 10' can handle the graphic processing apparatus 61 as a signal processing portion directly connected to the computer proper.

The detached apparatus shown in FIGS. 3 through 5B is only an example; any of the other apparatuses 62 through 65 may be detached as needed for direct connection to the computer apparatus 10. For example, the optical drive apparatus 64 may be detached from the docking station 50 and connected directly to the computer apparatus proper 10. The direct connection of the optical drive apparatus 64 allows the user to carry the computer apparatus 10 around and watch DVD's or the like on the road.

Although the PC proper 10' shown in FIGS. 4, 5A and 5B is equipped with the connection notch portion 16 shaped to be compatible with a single apparatus 61, the PC proper 10' may replace the connection notch portion 16 with a slot shaped to be compatible with the apparatus 61 and others. The apparatus 61 or some other apparatus may then be loaded into the slot. The location of the connection notch portion 16 or of the slot in the computer proper in the example of FIG. 4 is only an example; the connection notch portion 16 or the slot may be located elsewhere. Furthermore, the PC proper 10' may be furnished with a plurality of connection notch portions or slots to which a plurality of apparatuses detached from the docking station 50 may be attached altogether.

From a communication structure point of view, the apparatuses 61 through 65 attached to the connection portion 51 are connected in cascade. If a part of the apparatuses (e.g., one of apparatuses 61 through 65) is detached, connection is established with the computer apparatus proper 10 without the detached apparatus. This connection configuration will be explained in the paragraphs that follow.

[1-3. Connection Example of the First Embodiment]

Explained next is a typical configuration in which the apparatuses 61 through 65 in the docking station 50 are connected to the computer apparatus proper 10.

Figure 6:
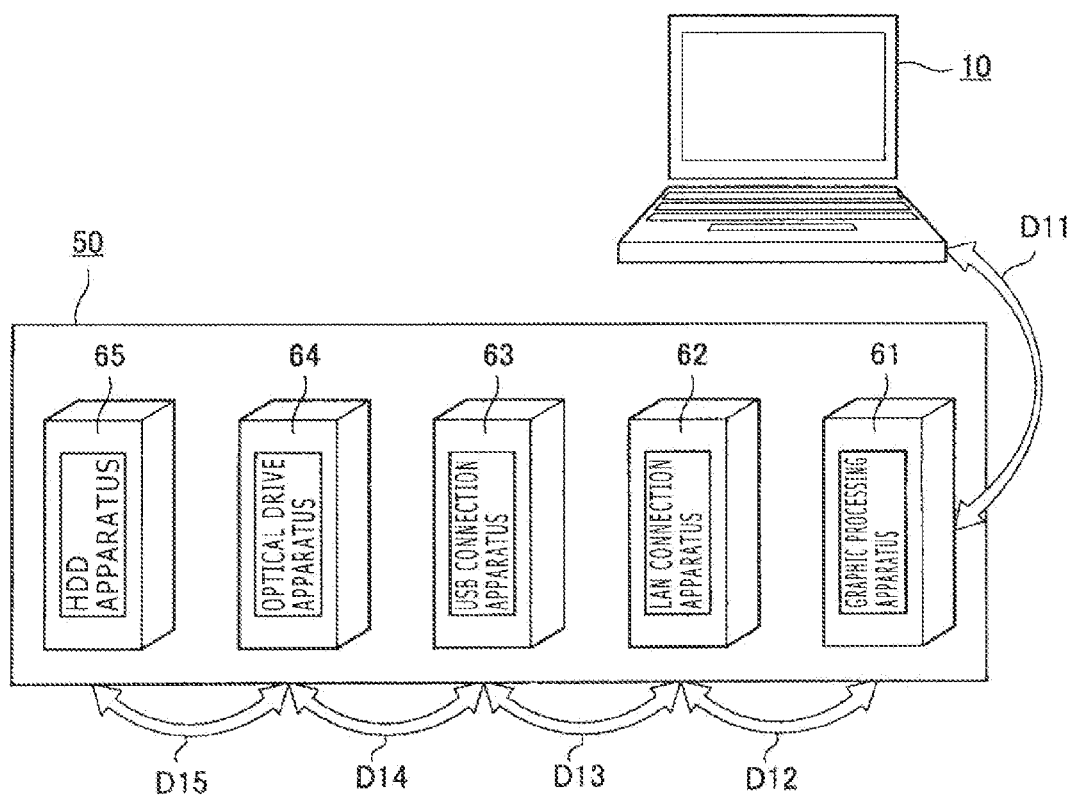
FIG. 6 is an explanatory view showing a connection example of the first embodiment of the present disclosure.

In the configuration of the first embodiment, the individual apparatuses 61 through 65 are connected in cascade to the computer apparatus proper 10. That is, when all apparatuses 61 through 65 are attached to the docking station 50 as shown in FIG. 6, the graphic processing apparatus 61 is connected to the computer apparatus proper 10 via a data transmission channel D11; the graphic processing apparatus 61 and LAN connection apparatus 62 are connected via a data transmission channel D12; the LAN connection apparatus 62 and USB connection apparatus 63 are connected via a data transmission channel D13; the USB connection apparatus 63 and optical drive apparatus 64 are connected via a data transmission channel D14; and the optical drive apparatus 64 and hard disk drive apparatus 65 are connected via a data transmission channel D15. Data is then transferred from one apparatus to another via the respective data transmission channels.

Figure 7:
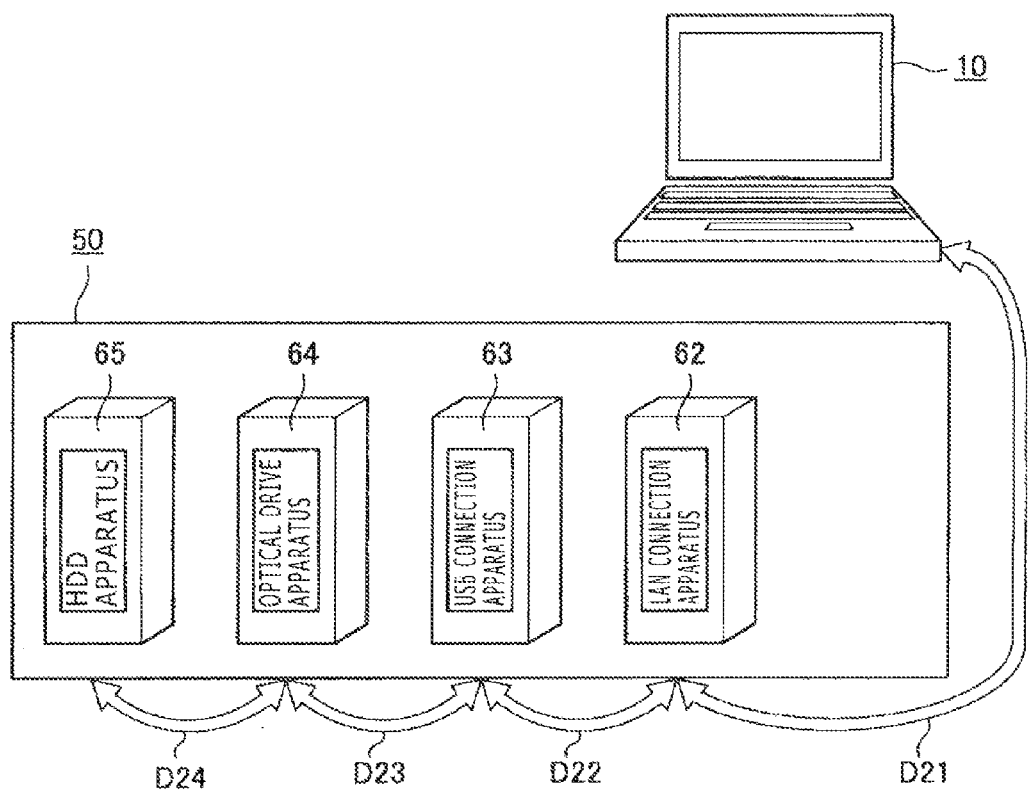
FIG. 7 is an explanatory view showing another connection example (a component apparatus detached) of the first embodiment.

If the graphic processing apparatus 61 is detached as shown in FIG. 4, there emerges a different state in which the computer apparatus proper 10 and LAN connection apparatus 62 are connected via a data transmission channel D21 as shown in FIG. 7. In this state, the LAN connection apparatus 62 and USB connection apparatus 63 are connected via a data transmission channel D22; the USB connection apparatus 63 and optical drive apparatus 64 are connected via a data transmission channel D23; and the optical drive apparatus 64 and hard disk drive apparatus 65 are connected via a data transmission channel D24. Data is then transferred from one apparatus to another via the respective data transmission channels. Even if any of these apparatuses is detached, the remaining apparatuses can unfailingly transfer data to and from the computer apparatus proper 10.

A changeover from the data transfer state of FIG. 6 to that of FIG. 7 may be carried out either automatically or manually. Switches for the changeover may be provided in the connection portion 51. Where the manual changeover is desired, connections between the apparatuses may be arranged manually to eliminate open terminals so as to keep the data transmission channels continuously connected.

[1-4. Typical Internal Structure (First Example) of the First Embodiment]

Explained next are typical internal structures of the docking station 50 of the first embodiment. Three typical internal structures (first, second and third examples) will be described.

The first example is explained below by referring to FIG. 8.

Prior to the explanation of the docking station 50, a typical internal structure of the computer apparatus proper 10 is briefly explained. The computer apparatus proper 10 is primarily made up of a central control portion (CPU) 101, a display processing portion 102, a storage portion 103, and an external interface portion 104. Also included in the computer apparatus is an optical communication portion 106 that conducts communications via an optical cable connected to the optical communication terminal 14. The optical communication portion 106 also performs processes for conversion between optical and electrical signals. The optical communication portion 106 is connected with a multiplexing/demultiplexing portion 105. Signals received by the optical communication portion 106 via an optical cable 40a are demultiplexed by the multiplexing/demultiplexing portion 105 into the signals coming from the apparatuses 61 through 65, before being sent to the central control portion 101 and the storage portion 103, among others. The signals to be transmitted from the optical communication portion 106 are multiplexed by the multiplexing/demultiplexing portion 105 for transmission over a single optical cable 40a. Alternatively, the optical communication portion 106 of the computer apparatus proper 10 may be connected directly with an optical communication portion of an external apparatus without the intervention of a cable as shown in FIG. 4.

The typical structure of the docking station 50 in FIG. 8 will now be explained. This is an example in which each of the apparatuses 61 through 65 attached to the docking station 50 incorporates all functional portions including their optical communication portions. In this example, the docking station 50 functions merely as a box (enclosure) that accommodates the apparatuses 61 through 65. As such, the docking station 50 is equipped only with connection terminals. The signals acquired through, these connection terminals are fed unmodified to the attached apparatuses. The switches for changing the transmission channels between the apparatuses may be furnished in the docking station 50.

The apparatuses 61 through 65 connected to the docking station 50 are the same as those shown in FIG. 6. They are made up of the graphic processing apparatus 61, LAN connection apparatus 62, USB connection apparatus 63, optical drive apparatus 64, and hard disk drive apparatus 65.

The graphic processing apparatus 61 includes an optical communication portion 610, a CIO switch portion 611, a protocol switch portion 612, and a graphic processing portion 613. The CIO switch portion 611 is a relay processing portion that sorts and composes data. The optical communication portion 610 performs bidirectional conversion between optical and electrical signals. The CIO switch portion 611 sorts data into the data needed by the graphic processing apparatus 61 and the data required by the other apparatuses 62 through 65. The data needed by the graphic processing apparatus 61 is transferred from the CIO switch portion 611 to the protocol switch portion 612. The transferred data is converted by the protocol switch portion 612 to a protocol that can be handled by the graphic processing portion 613, before being fed to the graphic processing portion 613. The data processed by the graphic processing portion 613 is forwarded to the CIO switch portion 611 also via the protocol switch portion 612. The CIO switch portion 611 combines the received data with the data coming from the other apparatuses and feeds the combined data to the optical communication portion 610. From the optical communication portion 611, the data is optically communicated to the PC proper 10.

The LAN connection apparatus 62 includes an optical communication portion 620, a CIO switch portion 621, a protocol switch portion 622, and a LAN port portion 623.

The USB connection apparatus 63 includes an optical communication portion 630, a CIO switch portion 631, a protocol switch portion 632, and a USB port portion 633.

The optical drive apparatus 64 includes an optical communication portion 640, a CIO switch portion 641, a protocol switch portion 642, and an optical drive portion 643.

The hard disk drive apparatus 65 includes an optical communication portion 650, a CIO switch portion 651, a protocol switch portion 652, and a hard disk drive portion 653.

The CIO switch portions 621, 631, 641 and 651 are functionally the same as the CIO switch portion 611 of the graphic processing apparatus 61. The protocol switch portions 622, 632, 642 and 652 are also functionally the same as the protocol switch portion 612 of the graphic processing apparatus 61.

And in this example, data is transferred between the CIO switch portions 611, 621, 631, 641 and 651 of the apparatuses 61 through 65 attached to the docking station 50 in a stacked manner. If any one apparatus (i.e., one of the apparatuses 61 through 65) is detached from the docking station 50, the data transmission channels between the apparatuses are changed so that data is not forwarded through the CIO switch portion of the detached apparatus, then the data is transmitted as shown in the example of FIG. 7. Changing the transmission channels to bypass the CIO switch portion of the detached apparatus may be accomplished either manually by the user manipulating switches (not shown) or automatically by use of switches or the like.

Figure 8:
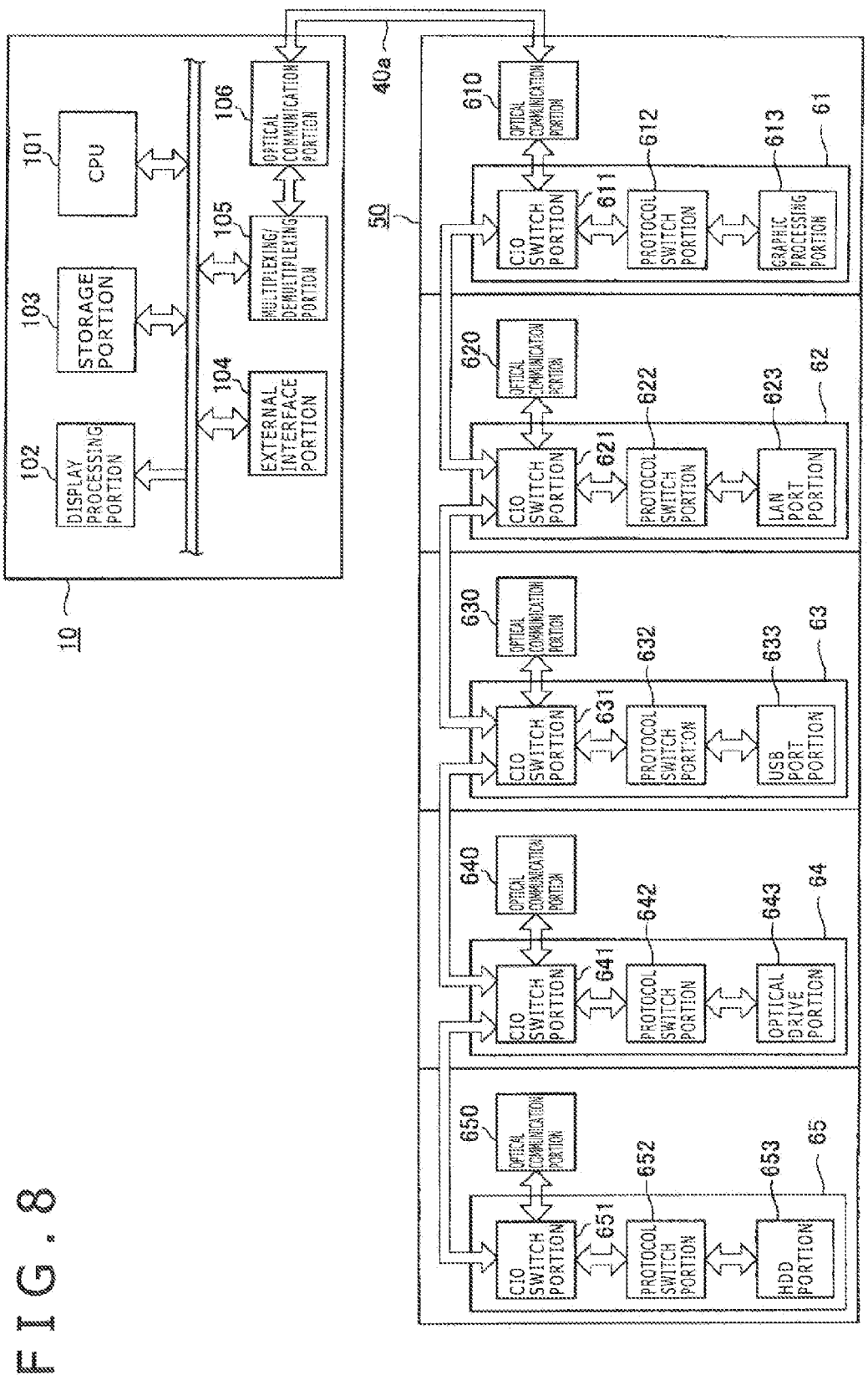
FIG. 8 is a block diagram showing a typical internal structure (first example) of the first embodiment.

Of the optical communication portions 610 through 650 of the apparatuses 61 through 65 in the structure of FIG. 8, only the one connected directly with the computer apparatus proper 10 (the optical communication portion 610 in the example of FIG. 8) is in use. In this state, if the graphic processing apparatus 61 is detached from the docking station 50, then the optical communication portion 620 of the LAN connection apparatus 62 is switched to establish connection with the computer apparatus proper 10.

[1-5. Another Typical Internal Structure (Second Example) of the First Embodiment]

Figure 9:
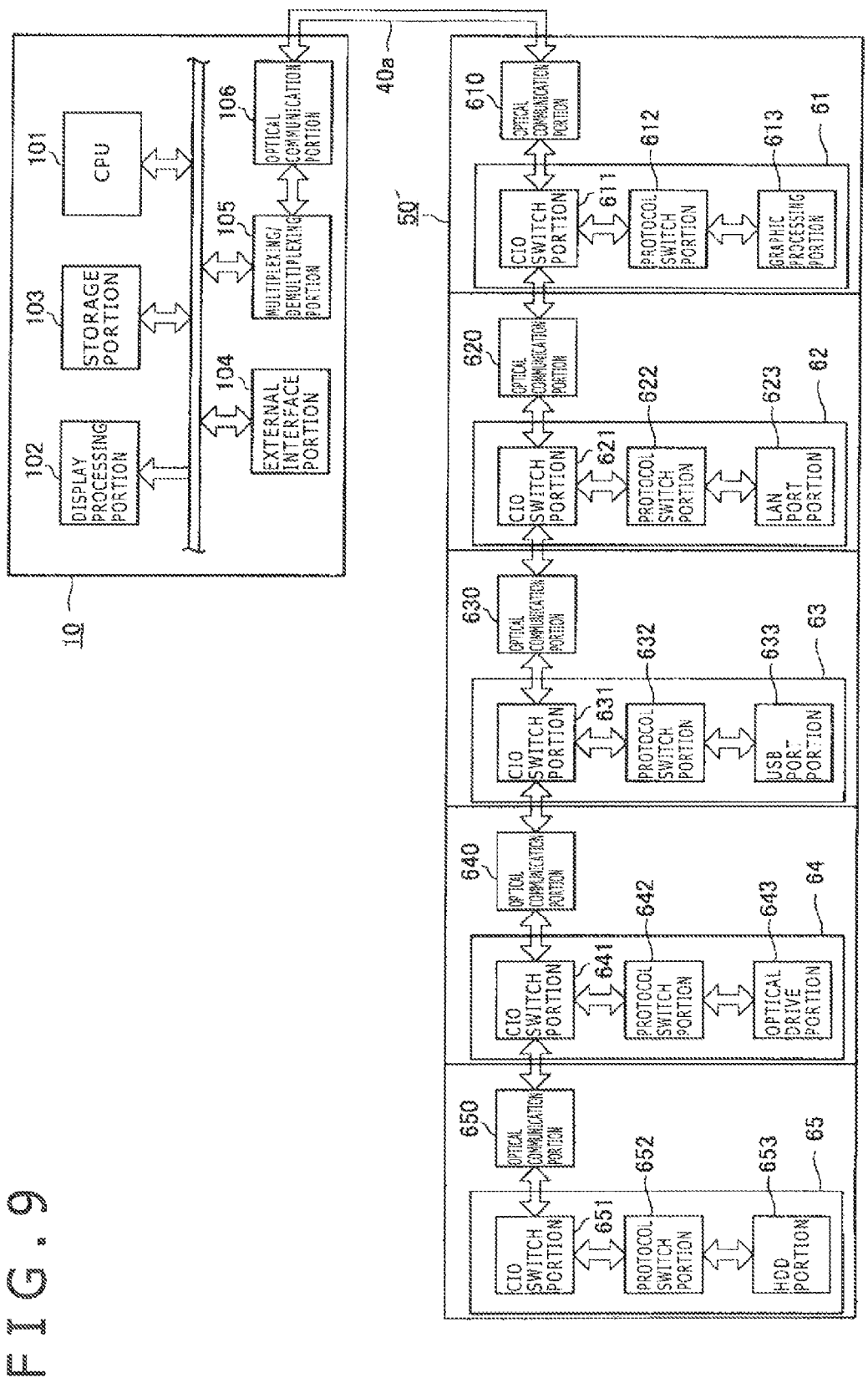
FIG. 9 is a block diagram showing another typical internal structure (second example) of the first embodiment.

Another example shown in FIG. 9 involves having the CIO switch portions 611, 621, 631 and 641 connected with the downstream optical communication portions 620, 630, 640 and 650 respectively in the apparatuses 61 through 65 that are connected in series in a docking station 50'.

In the example of FIG. 9, the CIO switch portions 611, 621, 631 and 641 of the individual apparatuses have built-in functions permitting data transfer to and from the optical communication portions of the downstream apparatuses. Such data transfer may be accomplished through either optical communication or electrical signal communication. Where electrical signals are to be transmitted, the optical communication portions may need to be equipped with suitable arrangements for electrical signal transmission. The other components in the example of FIG. 9 are the same as those in the example of FIG. 8.

[1-6. Another Typical Internal Structure (Third Example) of the First Embodiment]

Figure 10:
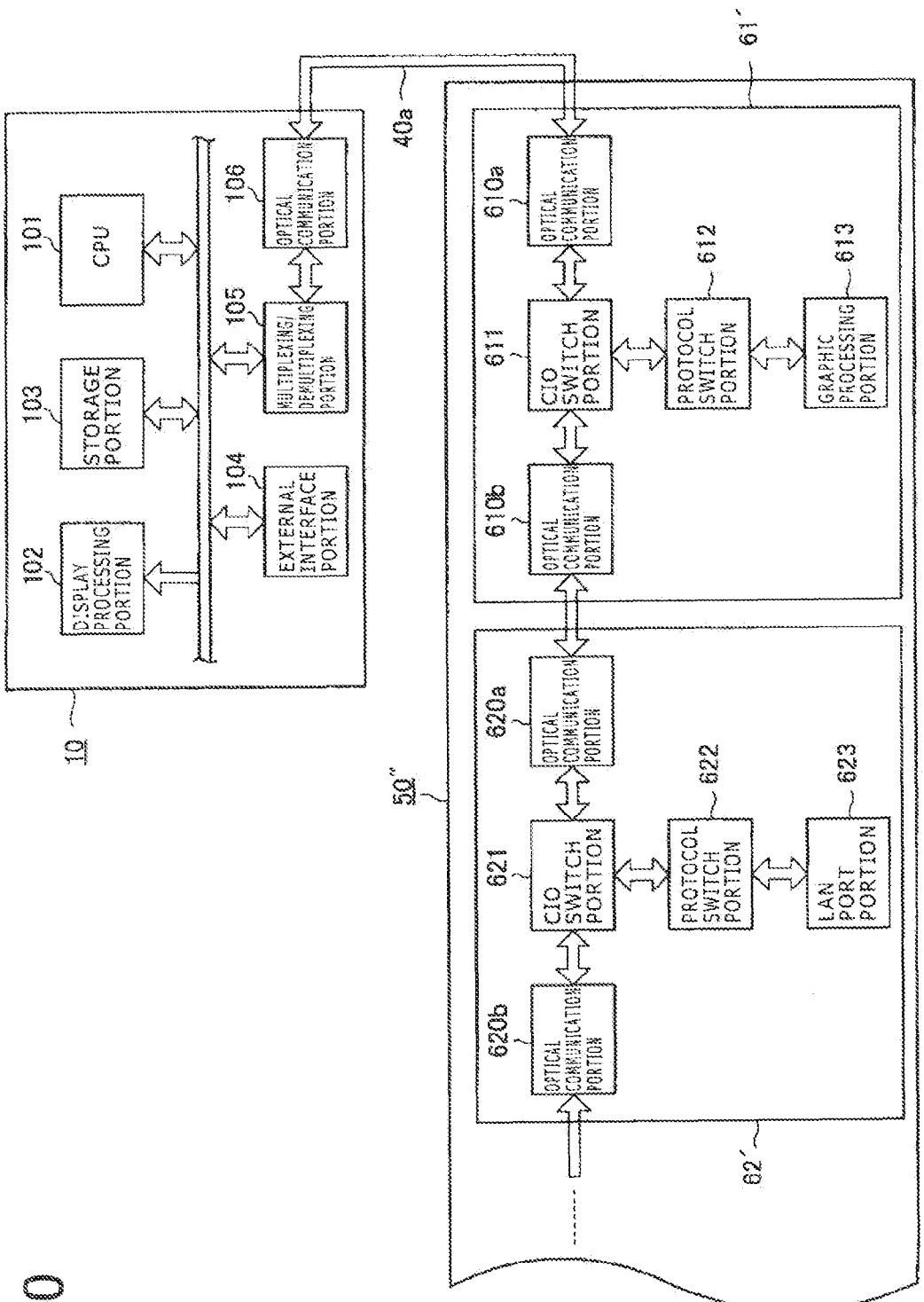
FIG. 10 is a block diagram showing another typical internal structure (third example) of the first embodiment.

Another example shown in FIG. 10 involves having apparatuses 61' through 65' attached to a docking station 50" in which optical communication portions 610a, 620a, etc., each communicate data optically with the immediately upstream apparatus and in which optical communication portions 610b, 620b, etc., each communicate data optically with the immediately downstream apparatus. Although FIG. 10 shows only the graphic processing apparatus 61' and LAN connection apparatus 62', the other apparatuses have the same structure each. The other components in the example of FIG. 10 are the same as those in the example of FIG. 8.

As shown in FIG. 10, each apparatus has an optical communication portion for communication with the immediately upstream apparatus and another optical communication portion for communication with the immediately downstream apparatus. This structure permits optical communication between the configured apparatuses. In the example of FIG. 10, data transfers between the optical communication portions 610a and 620a each communicating with the immediately upstream apparatus on the one hand, and the optical communication portions 610b and 620b each communicating with the immediately downstream apparatus on the other hand, are carried out via the CIO switch portions 611 and 621 furnished in the apparatuses 61' and 62' respectively. Alternatively, direct data transfers may be performed between the optical communication portions 610a and 620a communicating with the upstream apparatuses on the one hand and the optical communication portions 610b and 620b communicating with the downstream apparatuses on the other hand without the intervention of the CIO switch portions 611 and 621.

[1-7. Another Typical Internal Structure (Fourth Example) of the First Embodiment]

Figure 11:
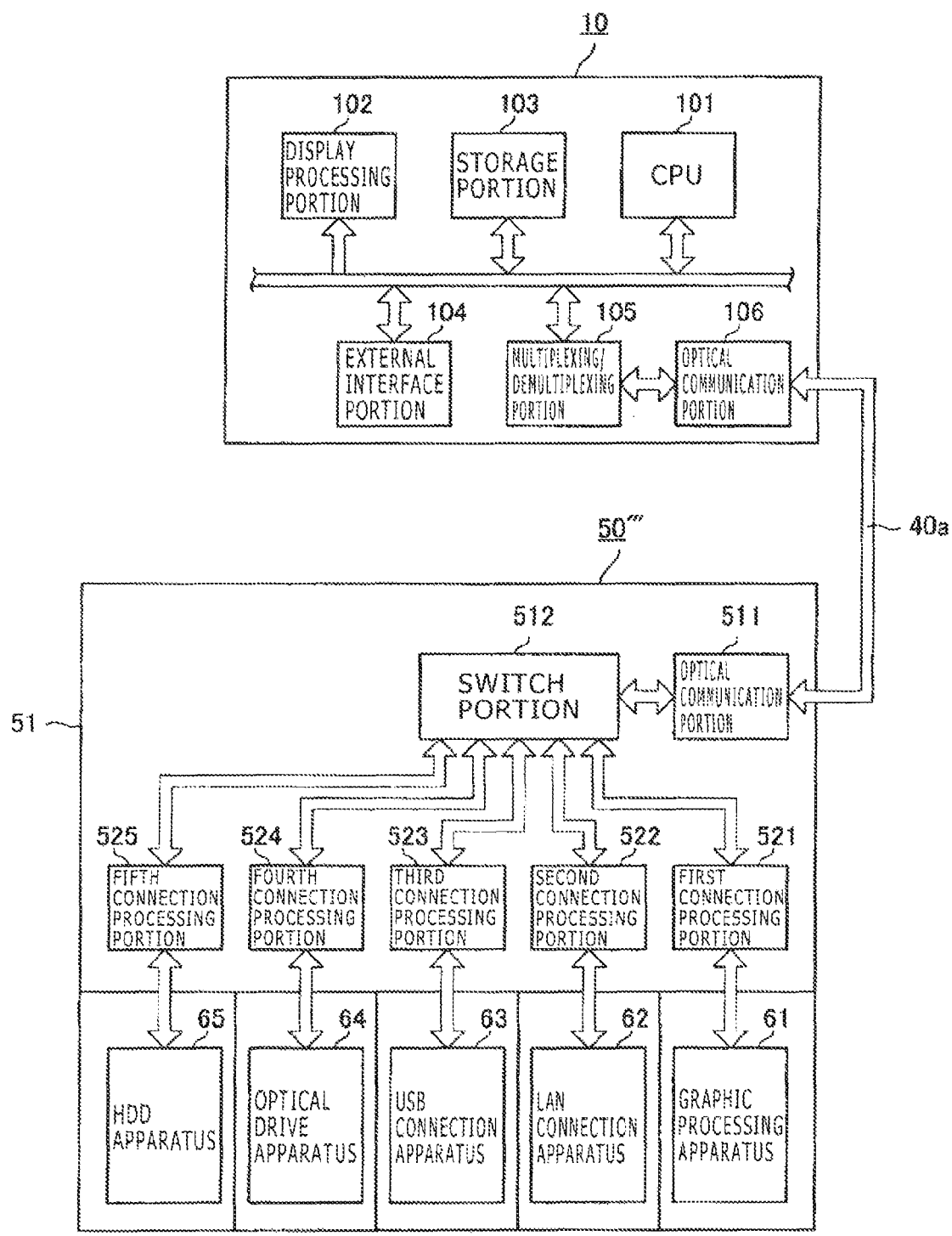
FIG. 11 is a block diagram showing another typical internal structure (fourth example) of the first embodiment.

FIG. 11 shows a typical structure of another docking station 50'''.

The docking station 50''' has an optical communication portion 511 connected with the optical cable 40a. The optical communication portion 511 performs processes for conversion between optical and electrical signals. The optical communication portion 511 is connected via a switch portion 512 to a plurality of connection processing portions 521, 522, 523, 524 and 525. The connection processing portions 521 through 525 serve as connection portions for connecting with the apparatuses 61 through 65 each being a processing function portion. That is, the connection processing portions 521 through 525 function as processing function connection portions.

More specifically, the first connection processing portion 521 is a processing portion for connecting with the graphic processing apparatus 61; the second connection processing portion 522 is a processing portion for connecting with the LAN connection apparatus 62; the third connection processing portion 523 is a processing portion for connecting with the USB connection apparatus 63; the fourth connection processing portion 524 is a processing portion for connecting with the optical drive apparatus 64; and the fifth connection processing portion 525 is a processing portion for connecting with the hard disk drive apparatus 65.

The switch portion 512 sorts the signals received by the optical communication portion 511 into those for the connection processing portions 521 through 525, and forwards the signals from the connection processing portions 521 through 525 to the optical communication portion 511 by selecting the received signals in a predetermined sequence so that these signals are multiplexed. In that sense, the switch portion 512 functions as a multiplexing/demultiplexing portion. Also, the processing by the switch portion 512 constitutes the transmission channels in cascade connection explained above in reference to FIGS. 6 and 7.

The connection processing portions 521 through 525 comply with the interfaces of the connected apparatuses 61 through 65. For example, the graphic processing apparatus 61 supports the USB standard, with a connection processing portion 54a including a USB terminal. The other apparatuses are equipped with terminals and ports compatible with USB or PCI (Peripheral Component Interconnect) standard buses.

The four typical internal structures shown in FIGS. 8 through 11 were explained above. Each of these examples is feasible. Alternatively, some other suitable internal structure may be adopted.

According to the first embodiment of this disclosure, the docking station 50 is structured as discussed above and connected with the computer apparatus proper 10. This setup allows the apparatuses 61 through 65 furnished in the docking station 50 to enhance the functionality of the computer apparatus. In this case, the docking station 50 is connected with the computer apparatus proper 10 using an optical cable that permits high-speed data transmission. The connection allows the apparatuses 61 through 65 in the docking station 50 to communicate large quantities of data at high speed with the computer apparatus proper 10. The processing involved is carried out substantially as fast as when executed by processing portions inside the computer apparatus proper 10, so that added apparatuses can be used without incurring stress. Moreover, since a fairly long optical cable can be used to connect the docking station 50 with the computer apparatus proper 10, there can be a high degree of freedom in setting up the computer and its docking station separated from one another over a certain distance. Also, the docking station 50 can be set up in either the horizontal layout or the vertical layout as shown in FIGS. 1 and 2. In this respect, the degree of freedom is further increased in setting up the computer and its docking station as desired by the user. In addition, as shown in FIGS. 4, 5A and 5B, any one of the apparatuses 61 through 65 in the docking station 50 may be freely detached from the docking station and connected to the computer apparatus. Thus when carrying around the computer, the user may take any one processing apparatus of the necessary function alone on the road. This provides further convenience to the user.

[2. Typical Connection Structures of the Second Embodiment]

Figure 12:
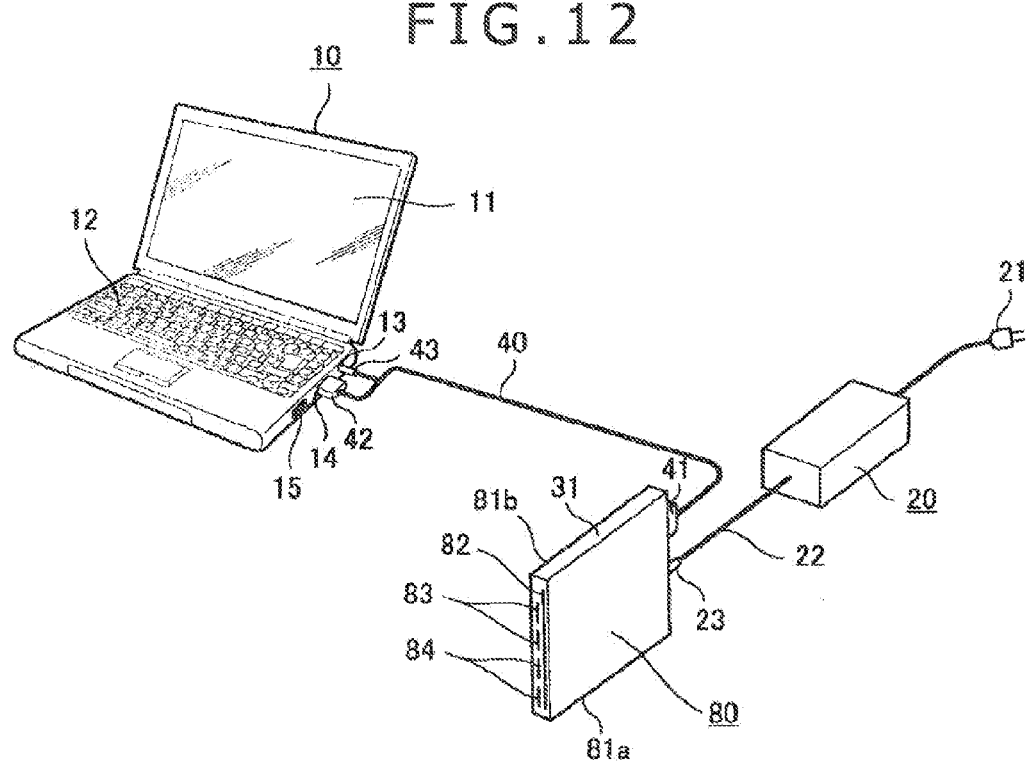
FIG. 12 is a perspective view showing a typical system configuration (a vertical layout example) as one example of a second embodiment of the present disclosure.
Figure 13:
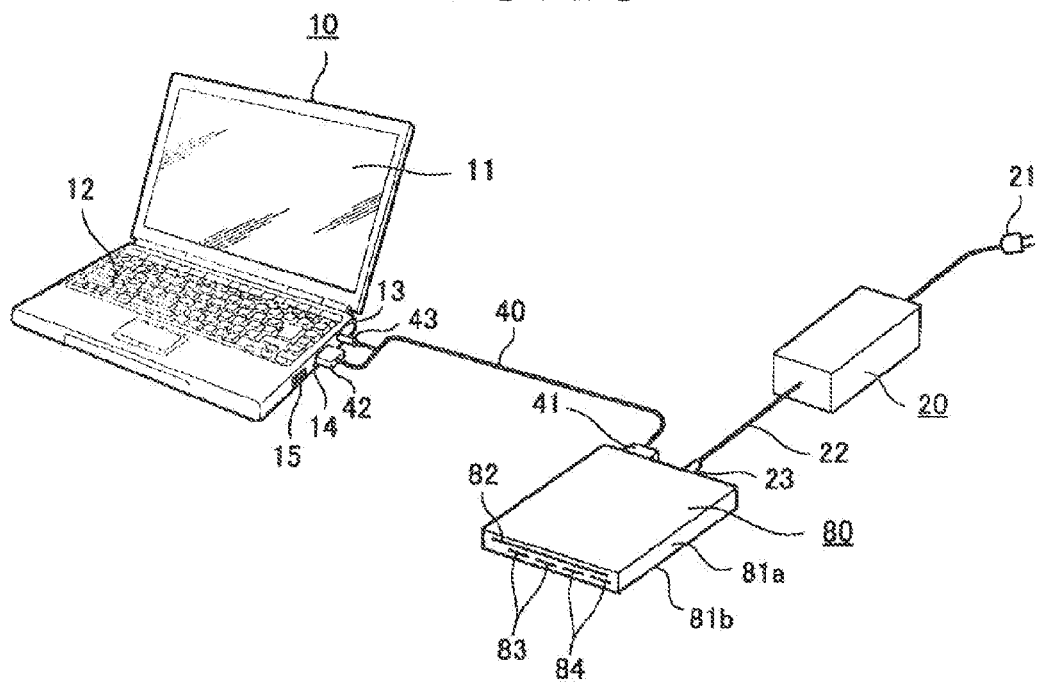
FIG. 13 is a perspective view showing another typical system configuration (a horizontal layout example) as another example of the second embodiment.

The second embodiment of the present disclosure will now be described in reference to FIGS. 12 and 13. Of the components in FIGS. 12 and 13, those whose corresponding counterparts are found in FIGS. 1 through 10 for the first embodiment are designated by like reference numerals. FIGS. 12 and 13 show a docking station 80 as set up in the vertical or horizontal layout. The connection structures are the same in FIGS. 12 and 13.

In the case of the second embodiment, the docking station 80 is an integral enclosure that incorporates various apparatuses.

Specifically, as shown in FIG. 12, the docking station 80 connected with the computer apparatus proper 10 constitutes a single, flat enclosure incorporating all apparatuses. For example, the docking station 80 may incorporate processing function portions corresponding to the graphic processing apparatus 61, LAN connection apparatus 62, USB connection apparatus 63, optical drive apparatus 64, and hard disk drive apparatus 65 explained above in connection with the first embodiment.

As shown in FIGS. 12 and 13, the front face of the docking station 80 is equipped with a disk loading portion 84, a LAN terminal 82, and a USB terminal 84.

The docking station 80 is connected with the computer apparatus proper 10 via the connection cable 40 that includes an optical cable. As in the example of FIG. 1, the AC adapter 20 connected to the docking station 80 also supplies power to the computer apparatus proper 10.

The relatively thin enclosure making up the docking station 80 may be set up in the so-called vertical layout, with a bottom 81a facing downward and with a side 81b positioned upright as shown in FIG. 12.

Furthermore, as indicated in FIG. 13, the enclosure may be set up in the so-called horizontal layout, with the side 81b facing downward and with the bottom 81a positioned upright.

Incidentally, the structure shown in FIG. 8 as one typical structure of the first embodiment may be adopted unmodified as an internal structure of the docking station 80. Unlike the structures of the first embodiment, those of the second embodiment shown in FIGS. 12 and 13 do not allow component apparatuses to be detached therefrom but permit a more, compact layout than before.

[3. Variations]

The shape of the computer apparatus and that of its connection apparatus (i.e., docking station) in the above-described embodiments are only examples and are not limited to those illustrated in the accompanying drawings. For example, although a laptop computer is shown in each drawing as the computer apparatus to which to connect the docking station, any other suitable type of computer apparatus may be used. Various information processing apparatuses other than the computer apparatus may also be connected with the docking station.

The data processing apparatus and data storage apparatus attached to the docking station (connection apparatus) and constituting part of the above-described embodiments are only examples. Alternatively, other types of data processing apparatus and data storage apparatus may be connected to the docking station.

For example, a data processing apparatus equipped with an HDMI terminal and a VGA terminal for connecting with an external display device may be connected to the docking station. As another alternative, a data processing apparatus furnished with an input/output portion handling audio signals may be connected.

In the above-described embodiments, the AC adapter was shown to connect with the docking station so that the computer apparatus is powered via the docking station. Alternatively, the AC adapter may be directly connected to the computer apparatus so that the docking station is powered from the computer apparatus via the connection cable. As another alternative, the computer apparatus and the docking station may each be provided with a separate AC adapter.

In the examples given in the accompanying drawings, the connection cable 40 was shown to be integrally composed of an optical cable and a power cable. Alternatively, the optical cable and the power cable may be separately provided.

The present disclosure contains subject matter related to that disclosed in Japanese Priority Patent Application JP 2011-000807 filed in the Japan Patent Office on Jan. 5, 2011, the entire content of which is hereby incorporated by reference.

It should be understood by those skilled in the art that various modifications, combinations, sub-combinations and alterations may occur depending on design requirements and other factors in so far as they are within the scope of the appended claims or the equivalents thereof.

What is claimed is:

1. An information processing system comprising:

an information processing apparatus proper configured to include an optical communication connection portion establishing optical communication connection;

a first functionality expansion apparatus configured to have an optical communication connection portion optically communicating with apparatus connected to the optical communication connection portion of said first functionality expansion apparatus, said first functionality expansion apparatus having a first processing function portion configured to process or store data for use by the information processing apparatus;

a second functionality expansion apparatus configured to have an optical communication connection portion optically communicating with apparatus connected to the optical communication connection portion of said second functionality expansion apparatus, said second functionality expansion apparatus configured for a second processing function portion; and a receiving portion for physically receiving said first and second functionality expansion apparatuses;

wherein said second functionality expansion apparatus optically communicates with said first functionality expansion apparatus when said first and second functionality expansion apparatuses are received by said receiving portion and are connected to each other through their respective optical communication connection portions, and said second functionality expansion apparatus communicates optically with said information processing apparatus proper when connected thereto through their respective optical communication connection portions.

2. The information processing system according to claim 1, wherein said second functionality expansion apparatus further includes:

a first connection portion configured to connect with said first functionality expansion apparatus.

3. A functionality expansion apparatus comprising:

an optical communication connection portion configured to perform optical communication with apparatus connected to the optical communication connection portion;

a processing function portion configured to process or store data for use by an information processing apparatus;

said optical communication connection portion being configured to connect with another functionality expansion apparatus having an optical communication connection portion and another processing function portion; and wherein said functionality expansion apparatus optically communicates with said other functionality expansion apparatus when said functionality expansion apparatuses are received by a receiving device and are connected to each other by the receiving device and through their respective optical communication connection portions, and said functionality expansion apparatus communicating optically with the information processing apparatus proper when connected thereto through the respective optical communication connection portions of the functionality expansion apparatus and the information processing apparatus.

4. A functionality expansion apparatus comprising:

an optical communication terminal portion configured to transmit an optical signal to and from an information processing apparatus proper;

a multiplexing/demultiplexing portion configured to demultiplex signals entering said optical communication terminal portion into different signal types and to multiplex signals to be output from said optical communication terminal portion; and a plurality of processing function portions at least one of which is configured to process or store data for use by the information processing apparatus, to receive demultiplexed signals from said multiplexing/demultiplexing portion, and to supply to said multiplexing/demultiplexing portion the data acquired by said at least one processing function portion, said plurality of processing function portions being physically received in a holding device and including switches to electrically interconnect the processing function portions through said holding device, the holding device including said optical communication connection terminal portion.

5. The functionality expansion apparatus according to claim 4, wherein said plurality of processing function portions are structured to be detachable from said holding device.

* * * * *